United States Patent [19]

Crane et al.

[11] Patent Number: 4,960,482

[45] Date of Patent: Oct. 2, 1990

[54] APPARATUS AND METHOD FOR MANUFACTURE OF ADHESIVE LABEL

[75] Inventors: John S. Crane, Savannah, Ga.; Dean A. Strauss, De Pere, Wis.

[73] Assignee: Belmark, Inc., De Pere, Wis.

[21] Appl. No.: 310,291

[22] Filed: Feb. 13, 1989

Related U.S. Application Data

[63] Continuation-in-part of Ser. No. 222,041, Jul. 20, 1988, abandoned, which is a continuation-in-part of Ser. No. 71,122, Jul. 8, 1987, abandoned.

[51] Int. Cl.$^5$ .............................................. B32B 31/00
[52] U.S. Cl. ..................................... 156/277; 118/46; 118/643; 156/249; 156/273.3; 156/273.7; 156/3.4; 427/55; 427/208; 427/208.8

[58] Field of Search ............... 156/277, 314, 249, 387, 156/273.3, 273.7; 427/55, 208, 208.8; 118/46, 643

[56] References Cited

U.S. PATENT DOCUMENTS 4,035,218 7/1977 Yount ................................ 427/208.8
4,336,279 6/1982 Metzger ................................ 427/55

Primary Examiner—John J. Gallagher
Attorney, Agent, or Firm—William Brinks Olds Hofer Gilson & Lione

[57] ABSTRACT

An apparatus and method for producing a label which includes the use of an infrared dryer operating at 1200°–1500° F. to cure the adhesive before the underlying ink is re-wetted and runs.

3 Claims, 4 Drawing Sheets

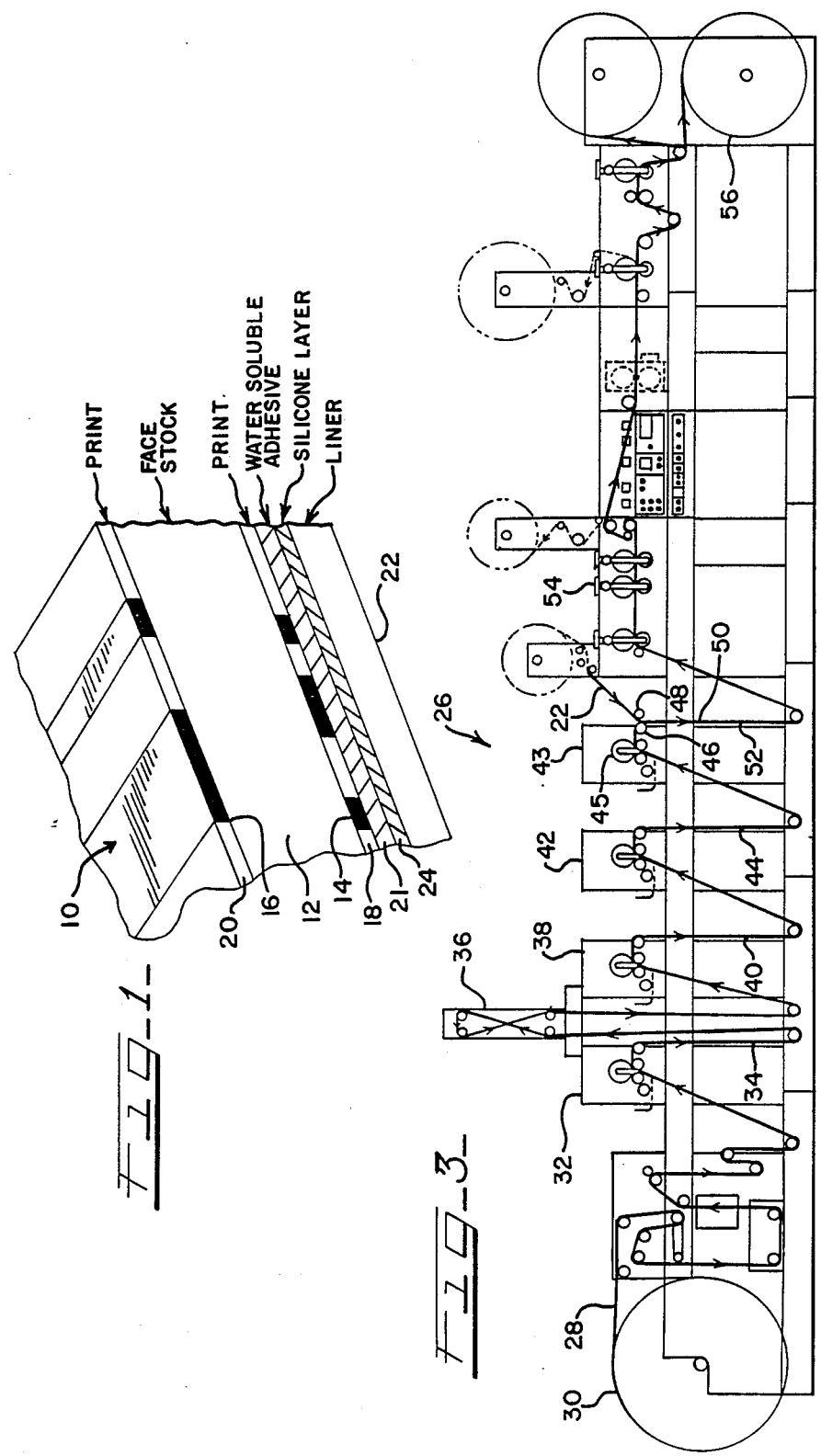

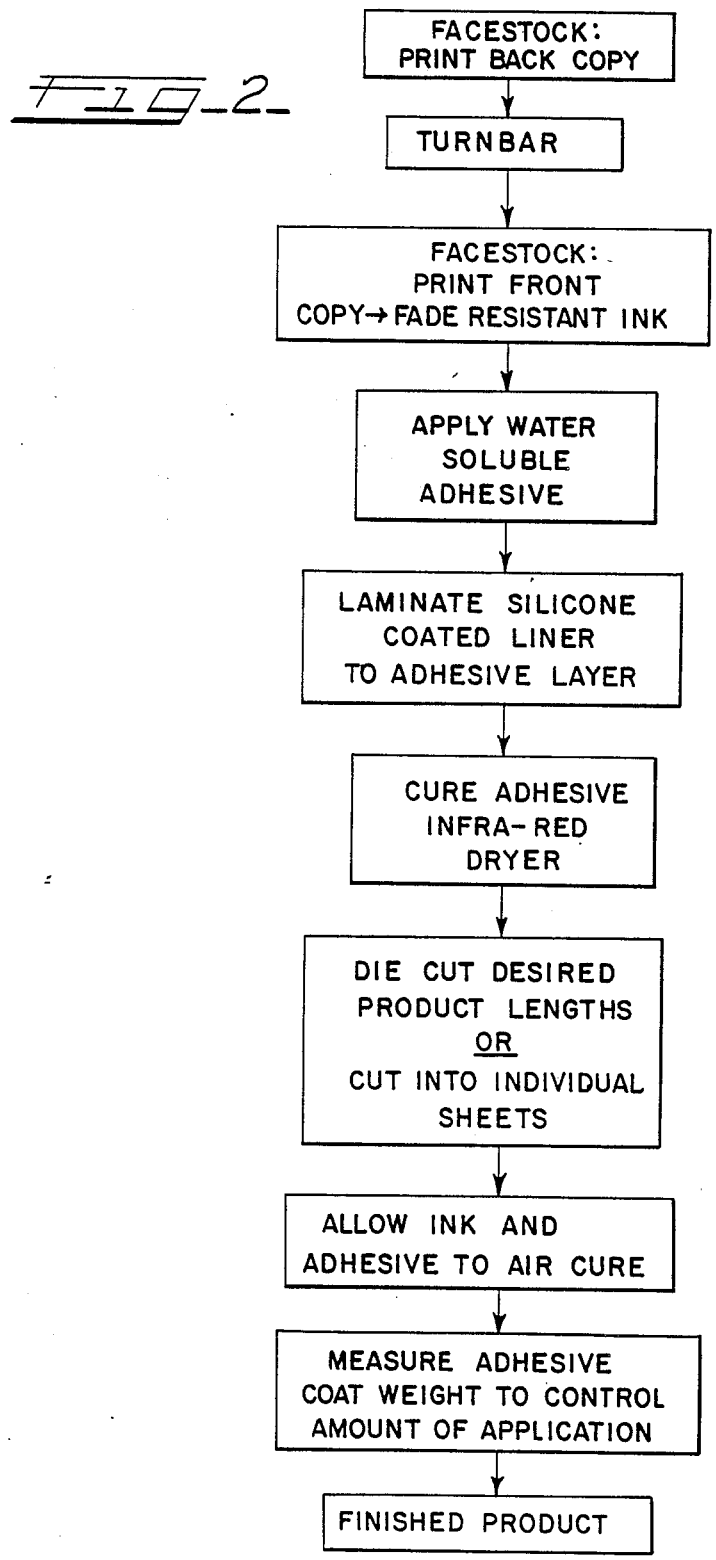

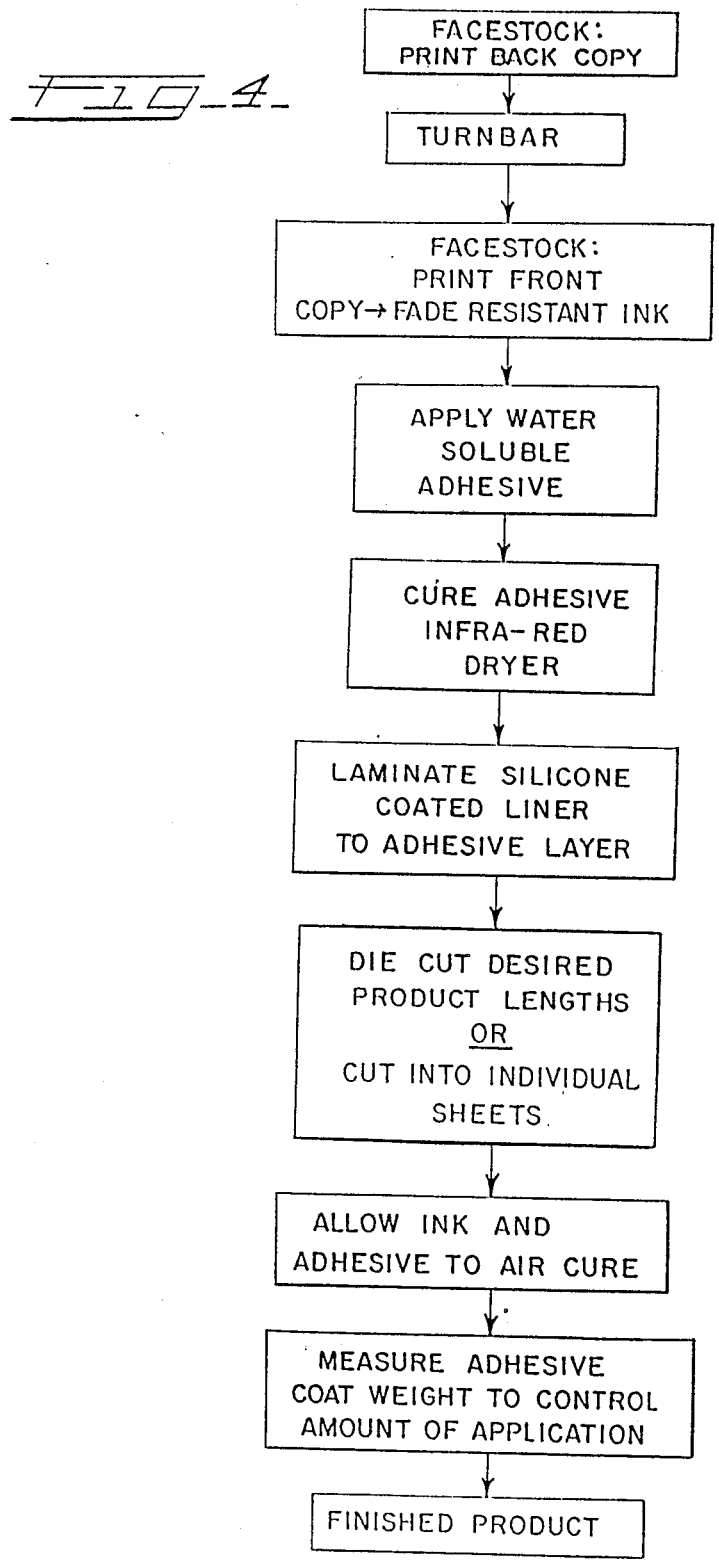

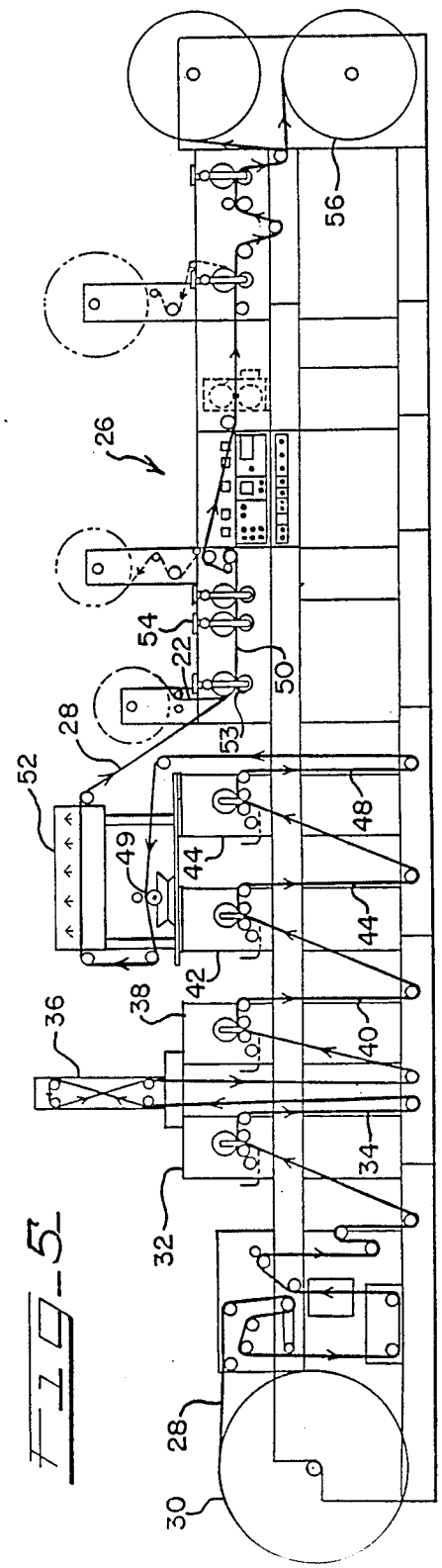

APPARATUS AND METHOD FOR MANUFACTURE OF ADHESIVE LABEL

CROSS REFERENCE TO RELATED APPLICATION

This application is a continuation-in-part of patent application No. 07/222,041 filed July 20, 1988 which was a continuation-in-part of patent application No. 07/071,122 filed July 8, 1987, both now abandoned.

FIELD OF THE INVENTION

The invention relates to the manufacture of adhesive labels in general, and in particular to an apparatus and method used for the manufacture of easily removable labels intended for application to a transparent surface.

BACKGROUND OF THE INVENTION

Manufacturers of glass or other transparent products, for example, window assemblies, often find it desirable to affix the manufacturer's logo or emblem to the product. Since both sides of a label mounted on any transparent medium are visible, it is also highly desirable that the label contain a duplicate logo or label removal instructions on the reverse side.

Known labels have met this need in one of two ways. The first is to print on both sides of the label and manually apply adhesive over the ink at the time of end use. However, this method is time consuming for the window manufacturer and it is difficult to control the application of the adhesive.

Another solution of the prior art has been to apply adhesive in the form of a double-sided transfer tape to the periphery of the label and away from the printed material. This type of label has the disadvantage that the label tends to bubble or wrinkle in the non-adhesive area when moist or wet, detracting from the overall aesthetics of the product to which the label is attached.

An alternative solution to the wrinkling problem is to use standard removable pressure sensitive label stock and print on the adhesive layer. This has two disadvantages. First, the print quality is marginal at best when the ink is applied directly to the adhesive side of the label stock. Second, an ink intensive logo may cover too much of the adhesive and cause unsuitable adhering qualities of the label.

Compounding the problem is the need for the purchaser or user to be able to easily remove the label. The adhesives used in the prior art, particularly those used with transfer tape, have a tendency to stick tightly to the glass when the label is removed. Users are often required to use a razor blade or scraper in combination with paint thinner or other solvent to remove the label, thus running the risk of scratching or etching the underlying material and damaging peripheral areas with solvent. It is therefore an object of the invention to provide a device and method for manufacturing a two-sided label that is easily removable yet which embodies good adhesive properties and high print quality.

SUMMARY OF THE INVENTION

The device of the present invention includes a printing press that applies an ink pattern to a continuous roll of label stock. A layer of adhesive is spread over the entirety of the roll of stock, thus covering the ink pattern. The adhesive is cured at a high temperature by an infrared heater to prevent the moisture in the adhesive from re-wetting the ink and causing it to run. A silicone transfer line is laminated over the adhesive layer.

The features and advantages of the invention will be further understood upon consideration of the following embodiments taken in conjunction with the drawings, in which:

BRIEF DESCRIPTION OF THE DRAWINGS

FIG. 1 is a cross-sectional view of the label produced by the invention shown in FIGS. 3 and 5;

FIG. 2 is a flowchart of a first preferred method of manufacturing the label of FIG. 1;

FIG. 3 is an illustration of a presently preferred embodiment of a device for manufacturing the label of FIG. 1 according to the method shown in FIG. 2;

FIG. 4. is a flowchart of a second preferred method of manufacturing the label of FIG. 1; and FIG. 5 is an illustration of a presently preferred embodiment of a device for manufacturing the label of FIG. 1 according to the method shown in FIG. 4.

DETAILED DESCRIPTION OF THE PRESENTLY PREFERRED EMBODIMENTS

FIG. 1 depicts a label 10 which consists of a sheet of water degradable face stock 12, having obverse and reverse surfaces 14, 16, respectively. Overlying surfaces 14, 16 are layers of ink 18, 20 in the form of printed matter. Overlying the printing on the obverse surface 14 is a layer of water soluble adhesive 21. The whole construction is releasably laminated to a transfer liner 22 used as a carrier and to protect the adhesive.

The pattern formed by ink layers 18, 20 may have the same spatial boundaries as the sheet of stock 12, however that is not required. For example, if the label stock is the same color as part of a company logo, there is no need to print that color on the label. In contrast, the adhesive layer 21 is coextensive with the label stock 12, thus avoiding the wrinkling and bubbling problems associated with prior art labels having adhesive only along their periphery.

Individually, each layer of the label 10 is known. The face stock 12 is a water degradable material that substantially disintegrates when wetted. A typical face stock 12 having the above characteristics is what is known in the art as standard coated one-side 60 pound face stock. Other face stocks, such as latex impregnated face sheet, are acceptable. The inks used on either side are preferably fade resistant for a period of 6 months when the label is exposed to sunlight or ultraviolet light. The transfer liner 22 is typically coated with a layer of silicone 24 which prevents permanent adherence of the label to the liner. These liners are characterized as having easy or hard releases. In the preferred embodiments, because of the low tack adhesive, a hard release (9KO) liner is used.

In furtherance of one of the goals of the invention, easy removal, the adhesive 20 is a permanent, pressure sensitive, water soluble resin emulsion. In the presently preferred embodiments, the adhesive is manufactured by Industrial Adhesives Corp., and identified as a "Breakaway Adhesive", Code No. G10–68X. This adhesive has a pH of 4.5–5.5 and a centipoise of approximately 2400.

In practice, the label 10 is placed upon an appropriate transparent surface such as a window. Once applied, the label adheres firmly to the window and cannot be repositioned. Removal is accomplished by wetting the label with a sponge or cloth. When sufficiently wetted, the face stock 12 of the label disintegrates and the adhesive 21 is taken into solution. The remnants of the label 10 can be wiped away with the wet cloth without leaving any residue and without the scraping or use of harsh solvents required by the prior art.

FIG. 2 sets forth a first preferred set of steps for manufacturing the label 10 of FIG. 1. FIG. 3 depicts a first presently preferred embodiment of the printing press 26 used to accomplish the steps of FIG. 2. In the first presently preferred embodiment, the press 26 is a Mark Andy Model 4120 flexographic printing press, modified as set forth below.

As shown in FIG. 3, a web of label stock 28 is continuously fed into the press 26 from supply roll 30. Print station 32 applies the removal instructions to the reverse side 16 of the label stock 12 (FIG. 1). The instructions are printed by standard flexographic printing techniques utilizing anilox rolls which form no part of the invention. If a duplicate logo is desired, additional print stations may be required as described below. The ink is cured at station 34 by an impinging hot air dryer supplied by the press manufacturer at a nominal temperature of 175° Fahrenheit.

The continuous web of stock then reaches turn bar 36 which flips the web 28 over for printing on what will be the obverse surface 14 of the stock 12. Print stations 38, 42 apply various color inks to the label stock in a preselected pattern. After each of the print stations, the ink is cured by hot air dryers 40, 44, which are substantially identical to dryer 34, thus preventing running of the ink, or smearing of the ink by the feed rollers of subsequent stages. The press depicted in FIG. 3 is adapted to print a two color label. It will be understood that additional colors require additional print stations.

After the last print station 42, the adhesive layer 21 is applied at station 43 by an anilox roll 45 in the same manner as the ink was applied. The anilox rolls used at the printing stations 32, 38, 42 are similar to those typically used in label manufacture (200-550 line anilox rolls). In contrast, the anilox roll used to apply the adhesive is a 133 line roll having a "volume" of approximately 15 microns.

Immediately after the adhesive is applied, the silicone transfer liner 22 is placed in contact with the adhesive layer 21 and laminated between pressure rollers 46, 48. The resultant web 50 is fed into a dryer 52 which, unlike the dryers of the ink printing stages, operates at a much higher temperature. The first presently preferred embodiment incorporates an infrared dryer manufactured by Development & Research Industries of Mamaroneck, N.Y. The temperatures within dryer 52 are preferably 1200°-1500° Fahrenheit. Due to the high temperatures, the adhesive 21 partially cures (approximately 50%) before it causes the ink layer 18 to completely re-wet and run. Upon exiting dryer 52, the web 50 is punched by die station 54 and collected by take-up spool 56. Alternatively, at the customer's specification, the web 50 may be cut into individual labels 10, or into desired lengths.

During the cutting and take-up of the web 50, the curing of the adhesive and ink is completed. It has been found through experimentation that if the labels 10 are peeled while still warm from exposure to the dryer 52, the partially re-wetted ink layer 18 has a tendency to come off with the transfer liner 22. After the labels cool to room temperature, this problem disappears and print quality remains high.

The temperature of the infrared heater is preferably selected to be as high as possible to facilitate rapid curing of the adhesive without burning the stock 12. It has been found through experimentation that temperatures ranging from 1200°-1500° F. permit an optimal web speed of 325 fpm ± 25 fpm. At this web speed, the quality of the transfer of adhesive to the stock 12 improves over what is attainable at other speeds.

The 133 anilox roll yields an adhesive coat weight of approximately 6½-7½ pounds per ream (one ream is approximately 3000 square feet). This is in contrast to the 12-15 lbs/ream employed in most applications of pressure sensitive adhesive.

FIG. 4 sets forth another preferred set of steps for manufacturing the label 10 of FIG. 1. In this sequence the adhesive is almost completely cured prior to laminating with the silicon transfer liner. By utilizing the infrared dryer 52 as described herein, the second presently preferred embodiment cures the adhesive at this stage to 90-95% in contrast with the embodiment of FIG. 3 in which the adhesive has been cured to approximately 50% at a similar stage. Thus there is no need to apply the liner immediately after the adhesive is applied.

FIG. 5 depicts a second presently preferred embodiment of the printing press 26 used to accomplish the steps of FIG. 4. In the second presently preferred embodiment, the press 26 is a Mark Andy Model 4120 flexographic printing press as described above, and further modified as set forth below.

The press depicted in FIG. 5 is adapted to print a two color label. It will be understood that additional colors require additional print stations.

After the last print station 45, the print is dried by dryer 48 and the web of label stock 28 is diverted upward and back through a Meyer-rod coater 49 which applies the adhesive layer 21. The Meyer-rod coater 49 utilizes a roller to apply an initial thick layer of adhesive to the label stock. The Meyer-rod 51 then shaves off the excess adhesive to the desired adhesive coat weight. The size of the Meyer-rod 51 determines the amount of adhesive 21 that remains on the web of label stock 28. The preferred size of the Meyer-rod is a No. 20 Meyer-rod with a yield of approximately 10½ pounds per ream. The coater system 49, 51 in the second presently preferred embodiment was designed and constructed by Viking Machinery Co., DePere, Wis. The design of the coater system 49, 51 is identical to the commercially available coaters except that it utilizes a smaller Meyer-rod (approximately 10 inches in length) and is enclosed in a smaller frame.

The Meyer-rod system can achieve a desired adhesive coat weight of approximately 10 ½ pounds per ream. This is in contrast to the 12-15 pounds per ream employed in most applications of pressure sensitive adhesive.

After the adhesive is applied, the web 50 is fed into a dryer 52 which, unlike the dryers of the ink printing stages, operates at a much higher temperature. The dryer 52 is designed to fit on top of the Meyer-rod coater 49. The second presently preferred embodiment incorporates an infrared dryer manufactured by the Moffitt Co., Chicago, Ill. In contrast to the infrared dryer of FIG. 3, this dryer is a larger dryer which generates more heat and has better air flow. The temperatures within dryer 52 are preferably 1200°-1500° Fahrenheit Due to the high temperatures and the hot air exhaust system in the dryer 52, the adhesive 21 is cured to a level of about 90–95% moisture-free which prevents the ink layer 18 from re-wetting and running.

Immediately after exiting the dryer 52, the adhesive coated web 28 is placed in contact with the silicone transfer line 22 and laminated by a set of lamination rollers 53. The resultant web 50 is punched by die station 54 and collected by take-up spool 56. Alternatively, at the customer's specification, the web 50 may be cut into individual labels 10, or into desired lengths.

While the invention has been described with reference to particular embodiments, those of skill in the art will recognize modification in material and arrangement which will nevertheless fall within the scope of the invention.

We claim:

1. A method of manufacturing a printed pressure sensitive label, said method comprising:
    applying an ink layer in a printed pattern to a sheet of stock;
    curing said ink at a first temperature;
    applying an aqueous adhesive layer to said cured ink layer over substantially all of said sheet; and
    curing said adhesive at a second temperature substantially higher than said first temperature in order to prevent said ink from running.

2. The method of claim 1 wherein said ink is cured at a temperature of approximately 175° F., and said adhesive is cured at a temperature of approximately 1200°–1500° F.

3. The method of claim 2 further comprising laminating a transfer liner over said adhesive layer before said adhesive is cured.

* * * * *